United States Patent
Fripp et al.

(10) Patent No.: US 11,904,546 B2
(45) Date of Patent: Feb. 20, 2024

(54) POLYMER SEAL FOR A WELLBORE DOWNHOLE TOOL WITH DIMENSION MECHANICAL PROPERTY GRADING AND MANUFACTURE THEREOF

(71) Applicant: Halliburton Energy Services, Inc., Houston, TX (US)

(72) Inventors: Michael Linley Fripp, Carrollton, TX (US); Chad William Glaesman, McKinney, TX (US); Anthony Phan, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 428 days.

(21) Appl. No.: 17/109,275

(22) Filed: Dec. 2, 2020

(65) Prior Publication Data
US 2022/0168954 A1  Jun. 2, 2022

(51) Int. Cl.
| | |
|---|---|
| *B29C 64/273* | (2017.01) |
| *E21B 33/12* | (2006.01) |
| *B29C 64/135* | (2017.01) |
| *B33Y 80/00* | (2015.01) |
| *B33Y 10/00* | (2015.01) |
| *E21B 33/128* | (2006.01) |
| *B29L 31/26* | (2006.01) |
| *B29K 105/00* | (2006.01) |

(52) U.S. Cl.
CPC .......... *B29C 64/273* (2017.08); *B29C 64/135* (2017.08); *B33Y 10/00* (2014.12); *B33Y 80/00* (2014.12); *E21B 33/128* (2013.01); *E21B 33/1208* (2013.01); *B29K 2105/0002* (2013.01); *B29L 2031/265* (2013.01); *E21B 2200/01* (2020.05); *Y10T 428/215* (2015.01)

(58) Field of Classification Search
None
See application file for complete search history.

(56) References Cited

U.S. PATENT DOCUMENTS

| | | |
|---|---|---|
| 10,358,890 B2 | 7/2019 | Zhong et al. |
| 2010/0019456 A1* | 1/2010 | Gerrard ................. C01B 32/158 |
| | | 277/336 |
| 2019/0127596 A1 | 5/2019 | Ellson et al. |

FOREIGN PATENT DOCUMENTS

WO   2019191509 A1   10/2019

* cited by examiner

*Primary Examiner* — Jeffrey D Washville
(74) *Attorney, Agent, or Firm* — Scott Richardson; Parker Justiss, P.C.

(57) ABSTRACT

Method of manufacturing a wellbore downhole tool, including providing a pre-polymer resin and processing the pre-polymer resin. Processing the pre-polymer resin includes applying directed energy from a directed energy source such that the pre-polymer resin is at least partially polymerized to form a polymer seal of the wellbore downhole tool, the polymer seal having one of more mechanical properties that differ along one or more dimensions of the polymer seal. A downhole tool for use in a wellbore, the downhole tool including a polymer seal. The polymer seal is a continuous single monolithic piece, includes polymer structures having a polymer chain including same types of monomers that are bonded together, and the polymer structures are altered along one or more dimensions of the polymer seal and one of more mechanical properties of the polymer seal differ along a same corresponding one of the or more dimensions of the polymer seal.

11 Claims, 3 Drawing Sheets

POLYMER SEAL FOR A WELLBORE DOWNHOLE TOOL WITH DIMENSION MECHANICAL PROPERTY GRADING AND MANUFACTURE THEREOF

BACKGROUND

Polymer seals are well-known components of wellbore downhole tools used in the oil and gas industry, including isolation tools, blowout preventer tools or other downhole tools. Pressure and temperature cycling in downhole wellbore environments can cause polymer seals to lose their mechanical integrity, deform and lose their sealing ability and thereby cause the downhole tool to fail. It is desirable to provide a polymer seal composition that can better withstand such environments.

BRIEF DESCRIPTION

Figure 1:
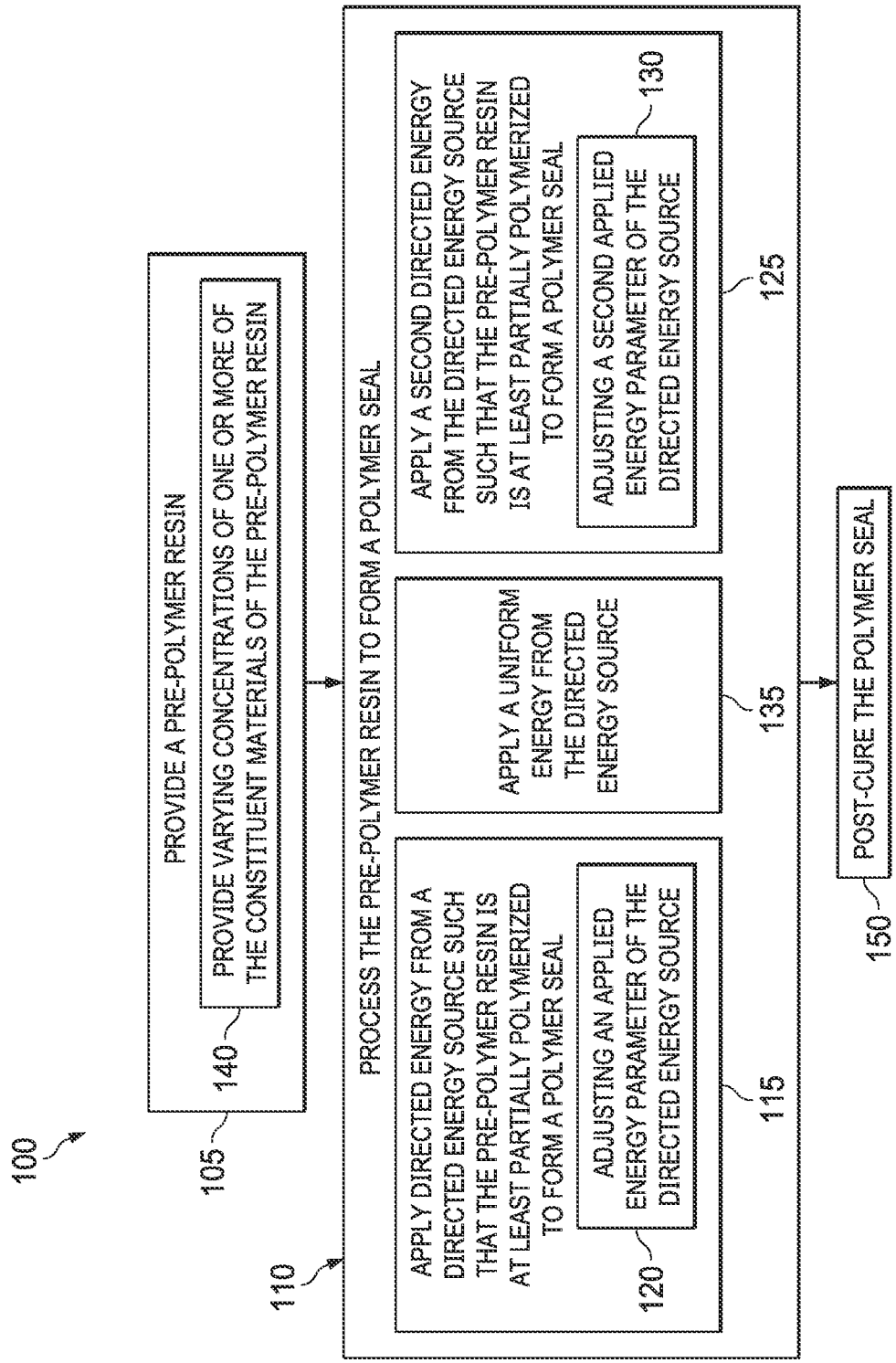
Figure 2:
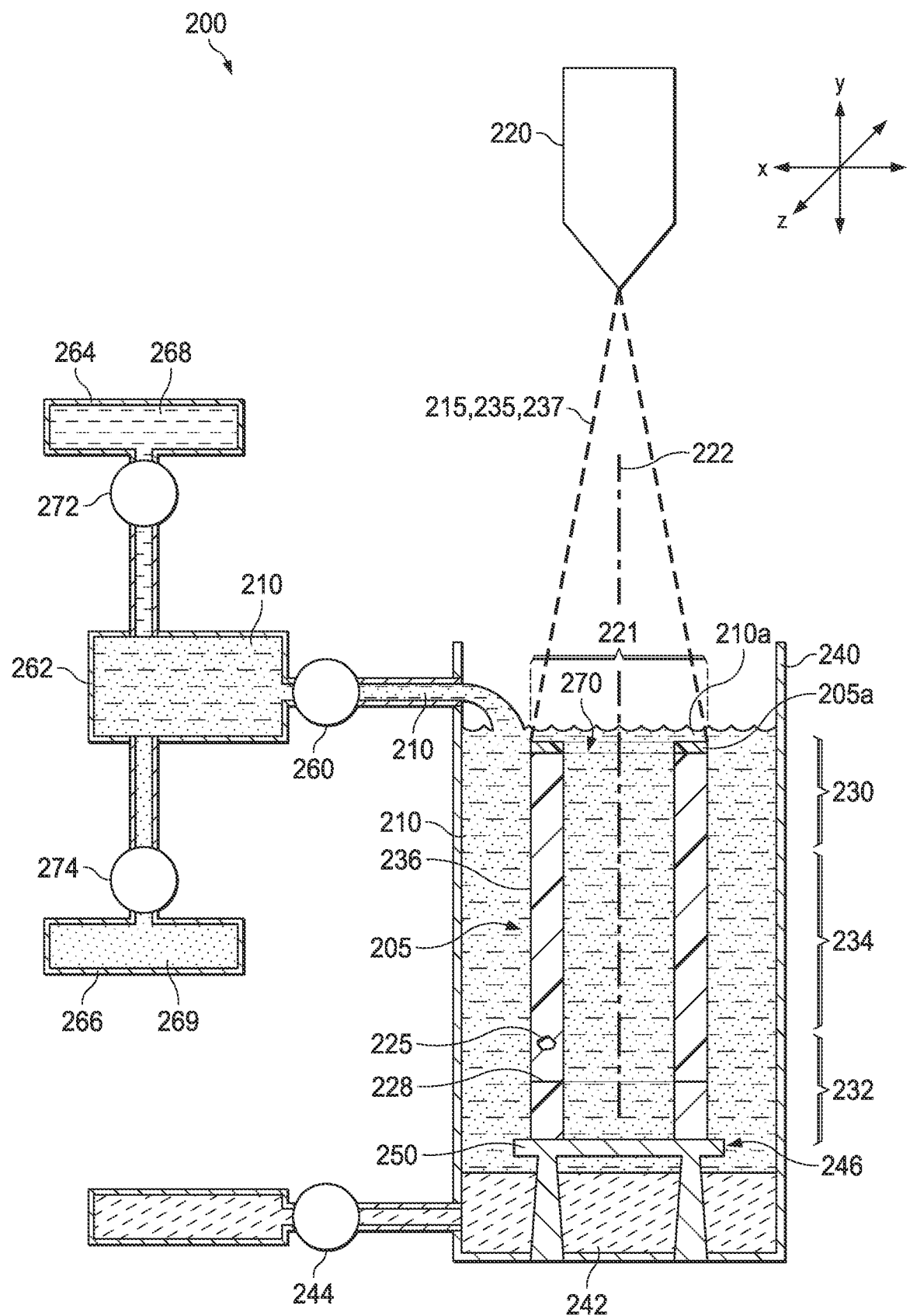
Figure 3:
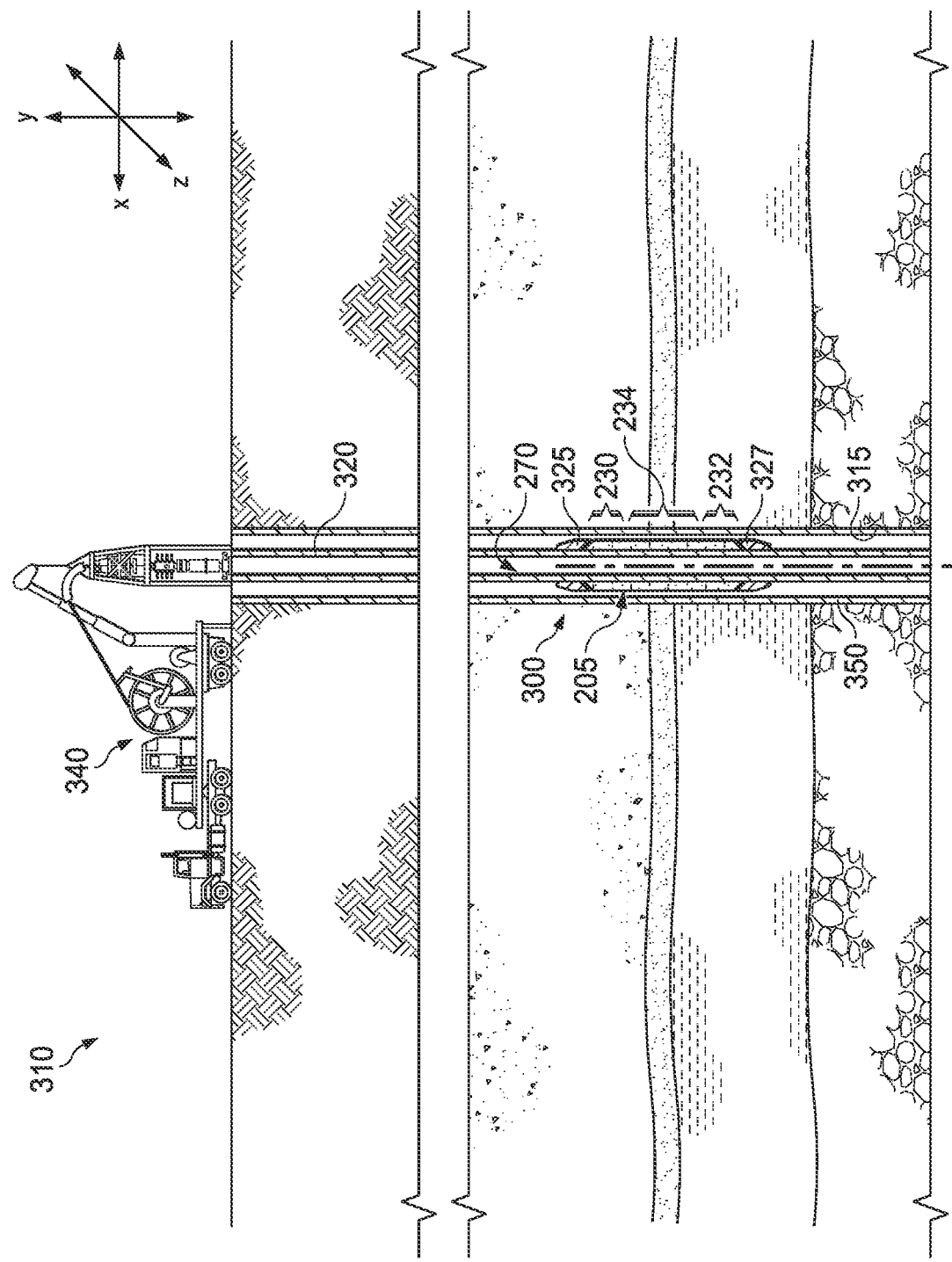

Reference is now made to the following descriptions taken in conjunction with the accompanying drawings, in which:

FIG. 1 presents a flow diagram of selected steps of an example method of manufacture including forming a polymer seal in accordance with the principles of the present disclosure;

FIG. 2 presents a schematic diagram of an example manufacturing system for making a polymer seal in accordance with the principles of the present disclosure; and FIG. 3 presents a cross-sectional view of a wellbore downhole tool of the disclosure implemented in a wellbore including any of the embodiments of the polymer seal disclosed herein.

DETAILED DESCRIPTION

As part of the present invention, we recognized that we could improve our polymer seal if we could manufacture the polymer seal such that we could grade, or vary, the mechanical properties of the polymer seal across one or more dimensions of the polymer seal. We discovered that forming polymer seals by a process that includes applying directed energy from a directed energy source (herein intended to be synonymous with the terms three dimensional, 3D, printing or additive manufacturing) allows fine geometric control and tailoring of the mechanical properties, such as a varying relative hardness, stiffness or strength. This, in turn, allowed the production of various types of polymers seals for application as sealing element components for a variety of different types of the downhole tools.

We believe that the manufacturing processes disclosed herein, and, the resulting polymer seals, can provide several advantages over certain conventional processes and the polymer seals produced thereby.

For instance, using some conventional processes, the polymer seal is manufactured to have uniform mechanical properties throughout, e.g., a polymer seal of uniform hardness or stiffness. This can be a compromise between competing physical requirements. E.g., if the polymer seal is too hard it become too difficult for the tool to compress the seal, versus the polymer seal being too soft, such that the seal is not sufficiently pressure resistant. In contrast, such compromises can be mitigated by manufacturing the polymer seal as disclosed herein, a polymer seal with geometrically tailored mechanical property, e.g., with some portions of the seal harder or stiffer and other portions of the seal softer or pliable.

For instance, for some conventional processes, the polymer seal is manufactured by assembling together multiple different polymer pieces, e.g., layers of polymer pieces, having different compositions with different harnesses than each other. However, an assembly of such different polymer pieces can disassemble and separate from each other when exposed to the varying pressures and temperatures of a downhole environment, e.g., by sliding or otherwise moving relative to each other due a change in friction between the parts in the environment. Even when the different polymer pieces are partially blended together, e.g., via compression molding, the blended interfaces at margins between the different pieces can still be prone to separation in the downhole environment. Additionally, the assembly of such multi-piece polymer seals can be prone to incorrect assembly resulting in a lower than desired service quality. Further, the shape of the interfaces between the different pieces (e.g., an interface angle between adjacent pieces) may not scale well for different sizes of polymer seal, thus requiring additional engineering and testing for each different size of seal. Finally, forming the assembly of such multi-piece polymer seal can be limited to changing the mechanical property with relatively coarse spatial resolution, e.g., along one geometric dimension as a series of layered pieces. In contrast, manufacturing the polymer seal as disclosed herein can produce a polymer seal that is a continuous single monolithic piece and thereby mitigate these problems associated with multiple-piece polymer seals. Moreover, the differing mechanical properties can be readily varied along multiple dimensions, including dimensions projecting radially from the center of a ring-shaped polymer seal, which may be difficult to reproducibly achieve using a multi-piece assembly and conventional processes.

We also believe that, compared to conventionally made polymer seals, embodiments of the polymer seal disclosed here can have improved sealing ability during temperature cycling due to the differing one of more mechanical properties (e.g., hardness) along the one or more dimensions of the polymer seal.

In the drawings and descriptions that follow, like parts are typically marked throughout the specification and drawings with the same reference numerals, respectively. The drawn figures are not necessarily to scale. Certain features of this disclosure may be shown exaggerated in scale or in somewhat schematic form and some details of conventional elements may not be shown in the interest of clarity and conciseness. Specific embodiments are described in detail and are shown in the drawings, with the understanding that they serve as examples and that they do not limit the disclosure to only the illustrated embodiments. Moreover, it is fully recognized that the different teachings of the embodiments discussed, infra, may be employed separately or in any suitable combination to produce desired results.

Unless otherwise specified, any use of any form of the terms such as "press," "connect," "engage," "couple," "attach," or any other term describing an interaction between elements is not meant to limit the interaction to direct interaction between the elements but include indirect interaction between the elements described, as well. In the following discussion and in the claims, the terms "including" and "comprising" are used in an open-ended fashion, and thus should be interpreted to mean "including, but not limited to." Further, any references to "first," "second," etc. do not specify a preferred order of method or importance, unless otherwise specifically stated but are intended to designate separate elements. The various characteristics mentioned above, as well as other features and characteristics described in more detail below, will be readily apparent to those skilled in the art with the aid of this disclosure upon reading the following detailed description of the embodiments, and by referring to the accompanying drawings.

To illustrate aspects of embodiments of the disclosure, FIG. 1 presents a flow diagram of selected steps in an example method 100 of manufacture including forming a polymer seal in accordance with the principles of the present disclosure. FIG. 2 presents a schematic diagram of an example manufacturing system 200 for making a polymer seal 205 in accordance any embodiments of the method 100 such as disclosed in the context of FIG. 1. FIG. 3 presents a cross-sectional view of an example wellbore downhole tool 300 of the disclosure including any of the embodiments of the polymer seal 205 disclosed in the context of FIGS. 1-2 or elsewhere herein.

One embodiment of the disclosure is method of manufacturing a wellbore downhole tool. With continuing reference to FIGS. 1-3 throughout, embodiments of the method 100 can include providing a pre-polymer resin 210 (step 105) and processing the pre-polymer resin 210 (step 110) including applying directed energy 215 from a directed energy source 220 (step 115) such that the pre-polymer resin is at least partially polymerized to form a polymer seal 205 of the wellbore downhole tool 300. The polymer seal 205 (FIG. 3) has one of more mechanical properties that differ along one or more dimensions of the polymer seal, e.g., along any of one or more dimension in three-dimensional space definable by Cartesian coordinates corresponding to abscissa (e.g., "x"), ordinate (e.g., "y") and applicate (e.g., "z" projecting in and out of the page depicted in FIGS. 2-3) axis coordinates.

As illustrated in FIGS. 2-3, a dimension of the polymer seal 205 parallel to a long axis 222 of the polymer seal 205 is depicted as being parallel to the ordinate, y, and this one dimension of the polymer seal has differing mechanical properties varied along the ordinate, y, or long axis 222. However, in other embodiments, the one dimension of the polymer seal having differing mechanical properties could vary along the abscissa, x, or the applicate, z, or the differing mechanical properties could vary along any dimension of the polymer seal 205 that is definable by any combination of these coordinates x, y, z.

The polymerization process initiated by the applied directed energy is a combination of chain growth and crosslinking, where the polymer is formed by bonding together monomers, present in the pre-polymer resin, in a sequential growing polymer chain and further includes crosslinking between monomer added to the polymer chain. That is, the growing polymer chains are joined together by crosslinked bonds between adjacent polymer chains. Either chain addition through polymerization can occur independently or polymerization and crosslinking both can occur. The crosslinked bonds can be a covalent bond, an ionic bond or combination thereof.

The term least partially polymerized as used herein means at least some crosslinking between the monomer components present in the pre-polymer resin such that the crosslinking density is at least about 40 percent by weight (wt %) based on the total weight of the polymer. One skilled in the pertinent art would understand how the crosslinking density of the partially polymerized polymer seal could range from at least about 40, 50, 60, 70, 80 wt % (e.g., ±2%), to nearly 100 wt % (e.g., about 90 or 95%) or to 100 wt % to provide sufficiently cured solid structure to allow physically manipulation of the seal, e.g., to be moved, without losing its intended shape. One skilled in the pertinent art would understand how to measure the crosslinking density of a polymer using convention techniques, e.g., by measuring the gel content or swelling of the polymer using standardized methods such as, or analogous to, ASTM D 2765.

Non-limiting examples of the differing mechanical properties that can be varied along the one or more dimension include hardness (e.g., as characterized by measuring a Shore durometer value), stiffness (e.g., as characterized by measuring a Young's modulus value), tensile strength (e.g., as characterized by measuring a strain-to-failure value), modulus (e.g., modulus at 50% strain and/or modulus at 200% strain), or combinations thereof.

In some embodiments, as part of the processing of the pre-polymer resin (step 110), the applying of the directed energy to the pre-polymer resin (step 115) includes adjusting an applied energy parameter of the directed energy source (step 120) such that the directed energy is varied so that the polymer seal is at least partially polymerized to have the one of more mechanical properties that differ along the one or more dimensions of the polymer seal. In some such embodiments, the adjusting of the applied energy parameter as part of step 120 can include varying a magnitude of electromagnetic radiation, an electromagnetic radiation frequency, a duration, a duty cycle, or combinations thereof, of the directed energy along the one or more dimensions of the polymer seal.

For example, the magnitude of the directed energy can be varied by varying an intensity of infrared, visible, ultra-violet, or microwave electromagnetic radiation emitted by the directed energy source along the one or more dimensions. For instance, the depth of the resin 210 that is cured (e.g., a depth of the voxel, corresponding to a small volume of resin, that is being polymerized by the radiation) depends on the energy of the applied radiation. The cure depth generally increases exponentially as the energy of the radiation increases. This energy variation can be used to change the interface between multiple layers and can be used to create a laminated seal which can help create variable hardness and, potentially, improve the chemical resistance or explosive decomposition of the polymer seal. For instance, the depth of the cure can also correlate with the shrinkage of the material of the polymer seal. A shallower penetration depth correlates with a tightly cross-linked, thin, cured profile that has decreased shrinkage during the curing process. Typical penetration depths do not exceed a few millimeters.

For example, the frequency of the directed energy can be varied by varying a frequency or wavelength the infrared, visible, ultra-violet, or microwave radiation emitted by the directed energy source along the one or more dimensions. For instance, the frequency of the radiation can be varied to that one photoinitiator, sensitive to one frequency, that is predominantly activated in some regions of the resin 210 while a different photoinitiator, sensitive to a different frequency, is predominantly activated in another region of the resin 210, and a third region of the resin 210 could have both photoinitiators activated but with different light intensities. For instance, different photoinitiators could produce different curing reactions, e.g., with one photoinitiator decomposing to initiate a peroxide cure and a second photoinitiator decomposing to initiate a sulfur cure.

For example, the duration of the directed energy can be varied by pulsing on and off the directed energy source, or the directed energy emitted therefrom, such that the directed energy reaching the pre-polymer resin 210 is for different durations along the one or more dimensions. A photoinitiation process is a time dependent process and polymerization does not happen instantly because there are kinetics to the reaction. By varying the length of time that the radiation is applied to a voxel, we can vary the amount of polymerization (e.g., hardening or some other mechanical property) of that voxel location. Longer radiation exposures at the end of the polymer seal (e.g., end regions 230, 232), e.g., to increase hardness to increase the extrusion resistance of the polymer seal.

Any of these applied energy parameter adjustments could be used to form voxel portions in the center of the polymer seal (e.g., center region 234) containing uncured resin or minimally cured (partially polymerized) resin that are surrounded by a lattice of voxels with more fully polymerized polymer to provide a hardened skin (e.g., skin 236), For instance, pockets (e.g., void pocket 225 or tear lines 228) corresponding to voxels containing of uncured resin to provide regions of the polymer seal having reduced hardness and/or provide the ability to tear the seal along specific lines.

One skilled in the pertinent art would be familiar with the various types of directed energy sources and directed energy typically used in 3D printing or additive manufacturing to facilitate applying locationally specific energy to different locations of the pre-polymer resin or partially polymerized polymer seal. As non-limiting examples, any of the types of directed energy sources and directed energy disclosed by Zhong et al. in U.S. Pat. No. 10,358,890 (Zhong), by Ellison et al. in US patent application 20190127596 (Ellison) or by Lund et al. in WO 2019191509, all of which are incorporated in their entirety herein, can be used. For example, the directed energy source can be a part of a three-dimensional printing, fused filament fabrication, selective heat sintering, selective laser sintering, fused deposition modeling, or other apparatus familiar to those skilled in the art. For example, the directed energy source can be a laser or digital light projector light source as part of stereolithography (SLA) and digital light processing (DLP) apparatus.

In some embodiments of the method 100, the applying of the directed energy 215 to the pre-polymer resin (step 115) results in a substantially fully polymerized form of the polymer seal 205 and the processing step 110 is complete, although the method can further include post-processing step as further disclosed below.

In some embodiments, the processing of the pre-polymer resin (step 110) includes the applying of a first energy corresponding to the directed energy applied to the pre-polymer resin (step 115) and applying a second energy to the pre-polymer resin or the partially polymerized form of the polymer seal (step 125), wherein the second energy corresponds to a second directed energy 235 that is different from the directed energy 215 of the first energy.

For instance, returning to the example of when the pre-polymer resin 210 includes two different photoinitiators sensitive to different frequencies or intensities the directed energy 215 of the first energy can be or include radiation at a frequency or intensity that activates a first photoinitiator and the second directed energy 235 of the second energy can be or include radiation at a second frequency or intensity that activates a second photoinitiator. In some such embodiments, adjustment of the applied energy parameter along the one or more dimensions of the polymer seal can be substantially the same for the first and second energy except for the different frequencies and/or intensities corresponding to the directed energy and second directed energy.

In other such embodiments, the applying of the second directed energy 235 to the pre-polymer resin includes adjusting a second applied energy parameter of the directed energy source (step 130) such that the second directed energy is varied along another of the one or more dimensions of the polymer seal that is different from the one or more dimensions that the first applied energy parameter is varied over.

For instance, again returning the example of when the pre-polymer resin 210 includes two different photoinitiators sensitive to different frequencies or intensities, the directed energy 215 of the first applied energy can be or include adjusting a first applied energy parameter (step 120) corresponding to the adjustment of radiation at a frequency or intensity of the directed energy to activate a first photoinitiator along one dimension (e.g., along the ordinate y parallel to the long axis 222), and, the second applied energy can be or include adjusting a second energy parameter (step 130) the second directed energy 235, corresponding to the adjustment of radiation at a second frequency or intensity of the second directed energy 235, to activate a second photoinitiator along different dimensions (e.g., radially, along the abscissa, x, and applicate z, or along any dimension in a plane defined by x and z, that is perpendicular to the long axis 222), than the dimension (e.g., along the ordinate, y) that the first applied energy parameter is varied over, such that the one of more mechanical properties differ along different dimensions than each other.

In some embodiments, the processing of the pre-polymer resin (step 110) includes the applying of a first energy corresponding to applying one of a uniform energy (e.g., uniform energy 237, step 135) or the directed energy (e.g., directed energy 215, step 115) to the pre-polymer resin such as disclosed above, and then, applying a second energy to the pre-polymer resin or the partially polymerized form of the polymer seal, the second energy corresponding to applying the other of the uniform energy or the directed energy. For instance, in some such embodiments a uniform energy 237 is applied from the energy source 220 in step 135 such there is no adjustment of any of the applied energy parameters along any of the one of more dimensions.

For instance, in some embodiments, uniform energy can be applied in step 135 to polymerize some of the resin 210 up to an including forming the partially polymerized polymer and then directed energy can be applied in step 115 with an applied energy parameter adjusted (step 120) along the one or more dimensions to complete the polymerization of the polymer seal 205 so as to have the one of more mechanical properties that differ along one or more dimensions of the polymer seal 205. Or, in other embodiments, directed energy can be applied in step 115 with an applied energy parameter adjusted (step 120) along the one or more dimensions to at least partially polymerization of the polymer seal 205 so as to have the one of more mechanical properties that differ along one or more dimensions of the polymer seal 205, and then, uniform energy can be applied in step 135 to further polymerize the partially polymerized polymer, e.g., to form a fully cured polymer seal 205.

While for simplicity, steps 115-135 refer to "a" directed energy source (e.g., energy source 220) one skilled in the pertinent art would appreciate that multiple different energy sources (e.g., different infrared, visible, ultra-violet, or microwave sources or other electromagnetic radiation sources) could be used to apply the directed energy 215, second directed energy 235 or uniform energy 237 as needed to facilitate the polymerization of the monomer of the pre-polymer resin 210 as disclosed herein.

In some embodiments, as part of providing the pre-polymer resin 210 in step 105, in step 140 varying amounts of constituent materials the pre-polymer resin 210 can be provided to facilitate forming the one of more mechanical properties that differ along the one or more dimensions of the polymer seal 205.

In some embodiments, the providing of the pre-polymer resin 210 in step 105 can include providing varying concentrations of one or more of the constituent materials of the pre-polymer resin (step 140) along at least one of the dimensions of the polymer seal during the processing pre-polymer resin (step 110 and any of its sub-steps 115, 120, 125, 130, 135) such that the at least partially polymerized polymer seal has altered polymer structures that results in the one of more mechanical properties to differ along the same at least one dimensions along which the concentrations of the one or more constituent material is varied. Non-limiting examples of altered polymer structures can include one or more of changes in crosslinking density, average molecular weight, chain branching, and grafting of functional monomers.

Embodiments of the pre-polymer resin 210 can include two or more different types of monomers each of the different types monomer having two or more functional groups. The pre-polymer resin can further include polymerization reaction inhibitors including anionic step-growth polymerization reaction inhibitors, photoinitiators, including photolatent bases that are decomposable upon exposure to radiation to form a non-nucleophilic base catalyst to initiate polymer chain growth, or light absorber bases.

Embodiments the polymer seal can be or include an elastomeric polymer. As a non-limiting example, some embodiments of the pre-polymer resin 210 can be or include a thiol-urethane resin including a first monomer that includes two or more thiol functional groups and a second monomer that includes two or more isocyanate functional groups, and which when processed according to embodiments of method step 110 forms a polymer seal 205 that is a polythiourethane polymer seal. As another example, some embodiments of the pre-polymer resin 210 can be or include a thiol-ene resin including a first monomer that includes two or more thiol functional groups and a second monomer that includes two or more ene functional groups, and which when processed according to embodiments of method step 110 forms a polymer seal 205 that is a polythioacrylate polymer seal. Further non-limiting examples of monomers, photoinitiators, and other constituent materials of the pre-polymer resin 210 are disclosed in the incorporated Zhong, Ellison and Lund references.

Any of the variations in the additive manufacturing processes described in the incorporated Zhong, Ellison and Lund references can be applied as part of the processing step 110.

As a non-limiting example consider the system 200 depicted in FIG. 2 which is configured as a top-down 3D SLA printing system 200 and configured to use a vat 240 to contain the pre-polymer resin 210 such as provided in step 105. The system 200 can further include an underlying liquid platform fluid 242, a liquid platform fluid pump 244, a build table 246 with a platform 250 also located in the vat 240, and the directed energy source 220. The liquid platform fluid 242 is denser than the resin 210 and insoluble in the resin 210. The platform 250 and the resin 210 can be positioned relative to each other in the vat 240 such that a thin layer of the resin is located over the platform 250 (e.g., thin resin layer 210a), e.g., by adding or subtracting the liquid platform fluid 242 to or from the vat 240 via the liquid platform fluid pump 244 and/or moving the platform 250, e.g., to cover a previously polymerized layer (e.g., layer 205a) of the seal 205.

Directed energy 215 (e.g., a patterned light beam) from the directed energy source 220 (e.g., a laser or digital light projector) can be directed into the vat 240 to selectively at least partially polymerize a targeted area (e.g., area 221) of the thin resin layer 210a as part of processing the pre-polymer resin to form the polymer seal 205.

As further depicted in FIG. 2, in some embodiments, as part providing the pre-polymer resin (step 105) and as part of step 140, a resin fluid pump 260 can deliver, from a resin reservoir 262, the pre-polymer resin 210 with varying concentrations of one or more of the constituent materials of the pre-polymer resin 210. For example, the one or more constituent materials that is varied in concentration can include changing concentrations of one or more of a first monomer, a second monomer, a polymerization reaction inhibitor, photoinitiators including photolatent bases, or a light absorber base present in the pre-polymer resin.

As a non-limiting example, in some embodiments of the system 200 each of the constituent materials to be varied in concentration can be contained in separate stock vessels 264, 266 (e.g., containing first and second photolatent bases 268, 269, respectively) and then delivered in varying proportions (e.g., via delivery pumps 272, 274) to the resin reservoir 262 which contains the other constituent materials of the resin which are not varied in concentration. Then the resin fluid pump 260 delivers pre-polymer resin 210 to the vat 240 as successive thin layers of the resin (e.g., thin layer 210a) which are processed in accordance with step 110 to form the polymer seal 205. In one example, the one dimension with varying concentrations of one or more constituent materials is along the ordinate y parallel to the long axis 222 of the polymer seal 205.

Following the processing step 110 the polymer seal 205, can be exposed to a post-curing step 150, where the finished polymer seal product is heated, e.g., to drive off volatile components. E.g., in some embodiments the finished polymer seal 205 includes or consists essentially of at least above 90, 95, 99 wt % of the polymer structure that the polymer seal is composed of, with the remainder including trace amounts of unreacted constituent materials of the pre-polymer resin 210 and/or in some embodiments plasticiser molecules, familiar to those skilled in the art, added to the polymer seal.

Based on the present disclosure, one skilled in the pertinent art would appreciate how any combination of steps 110-150 of the method 100 could be applied to manufacture the polymer seal having the one of more mechanical properties that differ along one or more dimensions of the polymer seal. Using the techniques of 3D printing/additive manufacturing familiar to those skilled in the art, the directed energy, and optional second directed energy, can be applied to form the polymer seal 205 with any desired shape. For example, in some embodiments of the method 100, the polymer seal 205 is manufactured to be a ring-shaped polymer seal. As non-limiting examples, embodiments of ring-shaped polymer seals includes structures having a opening (e.g., opening 270) and rotationally symmetrical structure around the opening such as cylindrical or spiral shaped polymer seal plugs, such as used in isolation tools or blowout preventer tools, including packer elements, o-rings, gaskets or other circularly shapes polymer seals of other downhole tools, or, a rotationally asymmetrical structure around the opening, such as a square shaped or D-shaped polymer seals as used in multilateral (MLT) or other downhole tools familiar to those skilled in the art.

Another embodiment of the disclosure is a wellbore downhole tool 300 for use in a wellbore. The downhole tool includes a polymer seal, such as any of the embodiments of the polymer seal 205 disclosed in the context of FIGS. 1-3 or elsewhere disclosed herein.

Again will continuing reference to FIGS. 1-3 throughout, the polymer seal 205 is a continuous single monolithic piece, includes polymer structures having a polymer chain including same types of monomers that are bonded together, and the polymer structures are altered along one or more dimensions of the polymer seal and one of more mechanical properties of the polymer seal differ along a same corresponding one of the or more dimensions of the polymer seal.

The entire monolithic polymer seal 205 has the same base constituent materials as provided in the pre-polymer resin 210, although in some embodiments, such as described in the context of step 140, there can be variations the concentration of one or more of the constituent materials, e.g., to facilitate varying the mechanical properties of the polymer seal along one or more dimensions of the polymer seal.

This is in contrast to conventionally manufactured polymer seals that are made of different types of polymers, e.g., polymers composed of different types of monomers to produce polymers with different mechanical properties. E.g., different types of polymers having different compositions provided as layers and assembled together to form the polymer seal or in some cases partially blended together at layer-to-layer interfaces, e.g., via compression molding or other conventional techniques. Unlike the polymer seal of this disclosure, such conventionally manufactured polymer seals, in addition to being mechanically discontinuous between layers and sometimes also visibly (e.g., macroscopically or microscopically) discontinuous at the interfaces between layers, are also chemical structurally discontinuous between layers.

In some embodiments of the tool 300, the polymer structures of the polymer seal 205 are altered by changes in crosslinking density between the sequential polymer chains along the one or more dimensions of the polymer seal (e.g., the extent of covalent or ionic bonding between adjacent polymer chains). In some embodiments, the polymer structures are altered by changes in average molecular weight (e.g., length) of the sequential polymer chain along the one or more dimensions of the polymer seal. In some embodiments, the polymer structures are altered by changes in side chain branching of the sequential polymer chain along the one or more dimensions of the polymer seal. Based on the present disclosure one skilled in the pertinent art would appreciate how crosslinking density, average molecular weight and side chain branching of the polymer structure could be altered alone or in combination to change the mechanical properties polymer seal 205 and how these changes could be used to create differing mechanical properties along the dimensions of the polymer seal that the polymer structures are altered along. For instance, in some embodiments the mechanical properties that differ along the one or more dimensions of the polymer seal, includes one or more of hardness, stiffness, or tensile strength. For instance, in some embodiments, increasing crosslinking density, average molecular weight or side chain branching could result in polymer structures with higher hardness or stiffness. For instance, in some embodiments, increasing average molecular weight or could result in polymer structures with higher hardness, stiffness and tensile strength. For instance, in some embodiments, increasing chain branching could result in polymer structures with lower hardness, stiffness and tensile strength.

In some embodiments, the polymer seal 205 includes an elastomeric polymer. As a non-limiting example, in some embodiments, the polymer structures have a copolymer chain composed of a sequential chain of a first monomer that included two or more thiol functional groups bonded by a thiourethane bond to a second monomer that included two or more isocyanate functional groups to form a polythiourethane polymer seal. In some embodiments the polymer structures have a copolymer chain composed of a sequential chain of a first monomer that included two or more thiol functional groups bonded by a thioether bond to a second monomer that included two or more ene functional groups to form a polythioacrylate polymer seal. One skilled in the pertinent arts would be familiar with various other polymer structures that could be used to manufacture the polymer seal is accordance with the disclosure.

In some embodiments, the polymer seal 205 is a ring-shaped polymer seal including any of the embodiments of ring-shaped seals disclosed herein.

In some embodiments, the polymer seal 205, the polymer seal is configured as one of a compression set packer, a swellable packer, inflatable packer, an o-ring, or a gasket.

As a non-limiting example, the polymer seal 205 can be configured as a compression set packer for use in the downhole tool 300 configured as a downhole isolation tool. In some such embodiments, a long axis length 222 of the compression set packer can have a continuously varied hardness ranging from a high hardness at one end of the compression set packer (e.g., end 230) to a low hardness at an opposite end (e.g., end 232) of the compression set packer. In some such embodiments, a long axis length 222 of the compression set packer has a hardness ranging from a high hardness at both ends of the compression set packer (e.g., ends 230, 232) to a low hardness in a center (e.g., center 234) of the compression set packer. In some such embodiments, an outer portion of the compression set packer (e.g., skin 238) has a higher hardness than an inner portion of the compression set packer. In some such embodiments, an inner portion of the compression set packer can include void pockets 225 or tear lines 228.

One skilled in the pertinent art would be familiar with the steps to assemble embodiments of the polymer seal with other component parts of the wellbore downhole tool 300. FIG. 3 further illustrates the embodiment of the tool 300 of the disclosure implemented in a plugging operations system 310 in a wellbore 315. For some such embodiments, the polymer seal 205 can be placed around a basepipe 320 of the wellbore 315 and ring members 325, 327 placed around the basepipe 320 and adjacent to the ends 230, 232 of the polymer seal 205, respectively, to hold the polymer seal 205 in a place along the basepipe 320. For instance, some embodiments of the polymer seal 205 can be configured to swell in response to contact with a particular fluid in the well, or, some embodiments can expand outward, e.g., as in inflatable or compression-set packers, etc.). Those skilled in the pertinent arts would understand how various embodiments of the polymer seal 205 could be configured to be pneumatically or hydraulically expandable in that the seal may be swellable by means of a fluid, or they may be expanded by means of fluid diffusion or inflated by other means.

FIG. 3 further illustrates an embodiment of the system 310 including a workover rig or truck 340 that supplies the basepipe 320 to which the downhole tool 300, as previously described, is attached. The system 310 may include a computer for controlling and monitoring the operations of the tool 300 during the packing operations. E.g., the operator may use a conventional monitoring system to determine when the tool 300 has reached the appropriate depth in the casing 350 of the wellbore 315. When the appropriate depth is reached, as part of the packing operations, the polymer seal 205 is caused to swell or expand, as described above, and such operation can be conducted on one or more plugging zones in the wellbore 315.

Disclosure Statements

Statement 1. A method of manufacturing a wellbore downhole tool, comprising: providing a pre-polymer resin; and processing the pre-polymer resin including applying directed energy from a directed energy source such that the pre-polymer resin is at least partially polymerized to form a polymer seal of the wellbore downhole tool, the polymer seal having one of more mechanical properties that differ along one or more dimensions of the polymer seal.

Statement 2. The method of statement 1, wherein the applying of the directed energy to the pre-polymer resin includes adjusting an applied energy parameter of the directed energy source such that the directed energy is varied such that the polymer seal is at least partially polymerized to have the one of more mechanical properties that differ along the one or more dimensions of the polymer seal.

Statement 3. The method of statement 2, wherein the adjusting of the applied energy parameter includes varying a magnitude, an electromagnetic radiation frequency, a duration, a duty cycle or a combination thereof, of the directed energy along the one or more dimensions of the polymer seal.

Statement 4. The method of statement 1, wherein the processing of the pre-polymer resin includes the applying of a first energy corresponding to the directed energy applied to the pre-polymer resin and applying a second energy to the pre-polymer resin or the partially polymerized form of the polymer seal, wherein the second energy corresponds to a second directed energy that is different from the directed energy of the first energy.

Statement 5. The method of statement 4, wherein the applying of the second directed energy to the pre-polymer resin includes adjusting a second applied energy parameter of the directed energy source such that the second directed energy is varied along another of the one or more dimensions of the polymer seal that is different from the one or more dimensions that the first applied energy parameter is varied over.

Statement 6. The method of statement 1, wherein the processing of the pre-polymer resin includes the applying of a first energy corresponding to one of a uniform energy or the directed energy to the pre-polymer resin and then applying a second energy to the pre-polymer resin or the partially polymerized form of the polymer seal, the second energy corresponding to applying the other of the uniform energy or the directed energy.

Statement 7. The method of statement 1, wherein the providing of the pre-polymer resin includes varying concentrations of one or more constituent materials of the pre-polymer resin along at least one of the dimensions of the polymer seal during the processing pre-polymer resin such that the at least partially polymerized polymer seal has altered polymer structures that results in the one of more mechanical properties differing along the same at least one dimensions along which the concentrations of the one or more constituent material is varied.

Statement 8. The method of statement 7, wherein the one or more constituent materials that is varied in concentration along the at least one dimension include changing concentrations of one or more a first monomer, a second monomer, a polymerization reaction inhibitor, a photolatent base, or a light absorber base present in the pre-polymer resin.

Statement 9. The method of statement 1, wherein the polymer seal is a ring-shaped polymer seal.

Statement 10. The method of statement 1, wherein the one of more mechanical properties that varies along the one or more dimensions of the polymer seal, includes one or more of hardness, stiffness, tensile strength or modulus.

Statement 11. A downhole tool for use in a wellbore, the downhole tool comprising: a polymer seal, wherein: the polymer seal is a continuous single monolithic piece, the polymer seal include polymer structures having a polymer chain including same types of monomers that are bonded together, and the polymer structures are altered along one or more dimensions of the polymer seal and one of more mechanical properties of the polymer seal differ along a same corresponding one of the or more dimensions of the polymer seal.

Statement 12. The downhole tool of statement 11, wherein the polymer structures are altered by changes in crosslinking density between the sequential polymer chains along the one or more dimensions of the polymer seal.

Statement 13. The downhole tool of statement 11, wherein the polymer structures are altered by changes in average molecular weight of the sequential polymer chain along the one or more dimensions of the polymer seal.

Statement 14. The downhole tool of statement 11, wherein the polymer structures are altered by changes in side chain branching of the sequential polymer chain along the one or more dimensions of the polymer seal.

Statement 15. The downhole tool of statement 11, wherein the one of more mechanical properties that differ along the one or more dimensions of the polymer seal, includes one or more of hardness, stiffness, or tensile strength.

Statement 16. The downhole tool of statement 11, wherein the polymer seal includes an elastomeric polymer.

Statement 17. The downhole tool of statement 11, wherein the polymer structures have a copolymer chain composed of a sequential chain of a first monomer that included two or more thiol functional groups bonded by a thiourethane bond to a second monomer that included two or more isocyanate functional groups to form a polythiourethane polymer seal.

Statement 18. The downhole tool of statement 11, wherein the polymer structures have a copolymer chain composed of a sequential chain of a first monomer that included two or more thiol functional groups bonded by a thioether bond to a second monomer that included two or more ene functional groups to form a polythioacrylate polymer seal.

Statement 19. The downhole tool of statement 11, wherein the polymer seal is a ring-shaped polymer seal.

Statement 20. The downhole tool of statement 11, wherein the polymer seal is configured as one of a compression set packer, a swellable packer, inflatable packer, an o-ring, or a gasket.

Those skilled in the art to which this application relates will appreciate that other and further additions, deletions, substitutions and modifications may be made to the described embodiments.

What is claimed is:

1. A downhole tool for use in a wellbore, the downhole tool comprising:
   a polymer seal, wherein:
   the polymer seal is a continuous single monolithic piece,
   the polymer seal include polymer structures having a polymer chain including same types of monomers that are bonded together, and the polymer structures are altered along one or more dimensions of the polymer seal and one of more mechanical properties of the polymer seal differ along a same corresponding one of the or more dimensions of the polymer seal.

2. The downhole tool of claim 1, wherein the polymer structures are altered by changes in crosslinking density between the sequential polymer chains along the one or more dimensions of the polymer seal.

3. The downhole tool of claim 1, wherein the polymer structures are altered by changes in average molecular weight of the sequential polymer chain along the one or more dimensions of the polymer seal.

4. The downhole tool of claim 1, wherein the polymer structures are altered by changes in side chain branching of the sequential polymer chain along the one or more dimensions of the polymer seal.

5. The downhole tool of claim 1, wherein the one of more mechanical properties that differ along the one or more dimensions of the polymer seal, includes one or more of hardness, stiffness, or tensile strength.

6. The downhole tool of claim 1, wherein the polymer seal includes an elastomeric polymer.

7. The downhole tool of claim 1, wherein the polymer structures have a copolymer chain composed of a sequential chain of a first monomer that included two or more thiol functional groups bonded by a thiourethane bond to a second monomer that included two or more isocyanate functional groups to form a polythiourethane polymer seal.

8. The downhole tool of claim 1, wherein the polymer structures have a copolymer chain composed of a sequential chain of a first monomer that included two or more thiol functional groups bonded by a thioether bond to a second monomer that included two or more ene functional groups to form a polythioacrylate polymer seal.

9. The downhole tool of claim 1, wherein the polymer seal is a ring-shaped polymer seal.

10. The downhole tool of claim 1, wherein the polymer seal is configured as one of a compression set packer, a swellable packer, inflatable packer, an o-ring, or a gasket.

11. A downhole tool for use in a wellbore, the downhole tool comprising:
a polymer seal, wherein:
the polymer seal is a continuous single monolithic piece,
the polymer seal consists of a polymer structures having a polymer chain including same types of monomers that are bonded together, and
the polymer structures are altered along one or more dimensions of the polymer seal and one of more mechanical properties of the polymer seal differ along a same corresponding one of the one or more dimensions of the polymer seal.

\* \* \* \* \*